Aug. 19, 1969  J. E. SENSI  3,462,253
MANUFACTURE OF FLOAT GLASS USING ENCLOSED BATH ZONES
Filed March 20, 1968  2 Sheets-Sheet 1

INVENTOR
JACH. E. SENSI
BY Chisholm & Spencer
ATTORNEYS

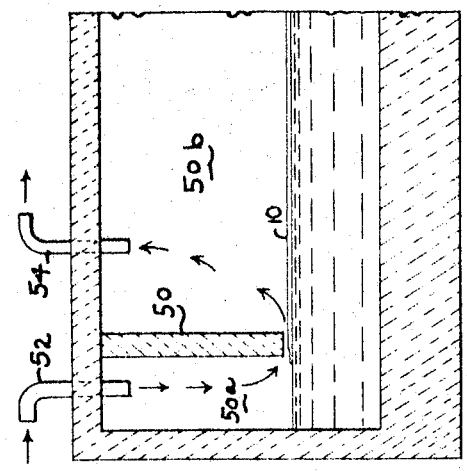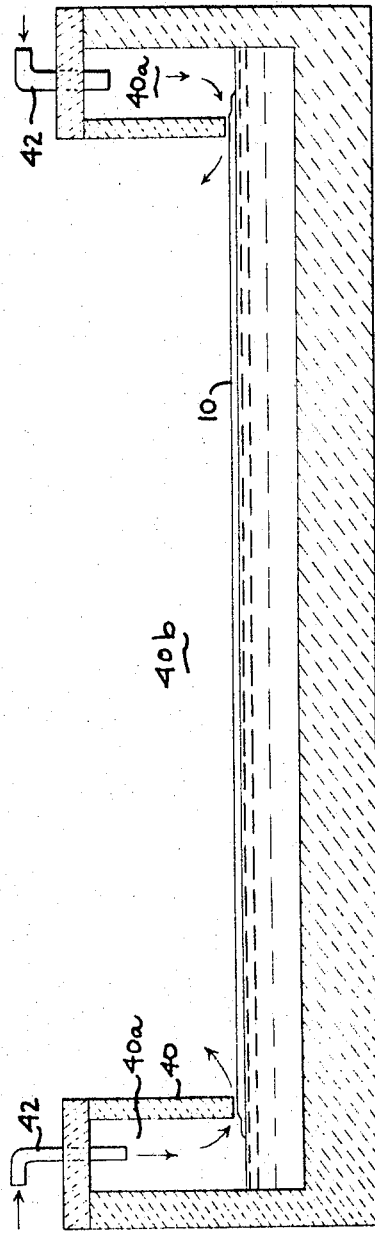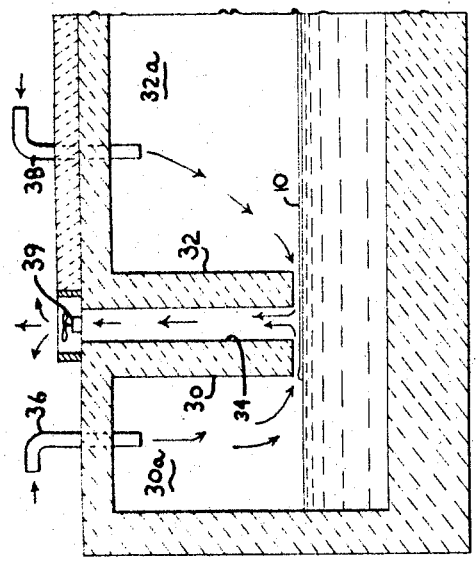

United States Patent Office 3,462,253
Patented Aug. 19, 1969

3,462,253
MANUFACTURE OF FLOAT GLASS USING ENCLOSED BATH ZONES
John E. Sensi, Arnold, Pa., assignor to PPG Industries, Inc., Pittsburgh, Pa., a corporation of Pennsylvania
Continuation-in-part of application Ser. No. 475,949, July 30, 1965. This application Mar. 20, 1968, Ser. No. 714,508
Int. Cl. C03b 18/00, 39/00
U.S. Cl. 65—99                                4 Claims

ABSTRACT OF THE DISCLOSURE

In the float glass process, enclosed zones are maintained over the liquid of the bath which is exposed outwardly of the edges of the glass ribbon thereon and a protective atmosphere is introduced into these zones. Another zone is maintained over the glass ribbon and a different atmosphere is maintained over and in contact with the glass.

Cross-reference to related applications

This application is a continuation-in-part of my now abandoned copending application, Ser. No. 475,949, filed July 30, 1965 and entitled "Manufacture of Glass."

Background of the invention

This invention relates to the production of glass by floating the glass in ribbon form on a liquid bath. The glass can be surfaced or sized and surfaced while so floating. More particularly, this invention relates to the protection of the liquid of the bath against oxidation.

As disclosed in Pilkinton U.S. Patent No. 3,083,551, issued Apr. 2, 1963, entitled "Manufacture of Flat Glass," a body of glass is floated on a bath of molten metal, generally tin or a tin alloy, so as to leave portions of the bath exposed to the atmosphere in the tank containing the bath and through which the glass passes. To prevent oxidation of the metal of the bath, and the formation of dross on the surface of the bath, a protective atmosphere is provided and maintained over the glass mass and the exposed metal of the bath, i.e., within the entire confines of the tank. Dross clings to the surface of glass, so as to make the glass unusable, and also causes operational difficulties, such as glass ribbon shifting, i.e., lateral snaking of the ribbon. Because of the exit and entrance of the glass into the tank and thus the probable escape of the atmosphere therein, the pressure in the tank is generally maintained slightly above the ambient pressure so that the ambient atmosphere will not flow into the tank and cause oxidization of the bath. Further, various seals may be used at the exit and entrance ends of the tank, as for example, a gas curtain projected toward the glass at the glass entrance and exit of the tank.

In the prior art just described, the protective atmosphere is supplied to the tank above the exposed bath and also above the mass of glass. To accomplish this, a large quantity of protective atmosphere is used which adds to the cost of the process. This is especially true when the glass is also sized in accordance with the teachings in the copending application of Edmund R. Michalik, Ser. No. 188,664, filed Apr. 19, 1962, entitled "Manufacture of Glass" (now abandoned) and its continuation-in-part application, Ser. No. 251,682, filed Jan. 15, 1963, which issued Mar. 22, 1966, as Patent No. 3,241,939, entitled "Method of Manufacture of Flat Glass."

It is proposed, according to the present invention, to supply a protective atmosphere adjacent the margins of the glass and over and in contact wtih the exposed liquid bath, which protective atmosphere will protect the exposed bath against oxidation. It is also proposed to provide apparatus suitable for producing glass in the manner described with special construction permitting the maintenance of a protective atmosphere adjacent the margins of the glass and over and in contact with the exposed bath. The atmosphere over and in contact with the upper surface of the glass is different from that over and in contact with the exposed metal of the bath. Such atmosphere over and in contact with the upper surface of the glass may be oxidizing; it may be the ambient atmosphere; or it may be air or another gas under pressure, depending upon the particular product being produced, especially as regards to thickness.

The use of a different atmosphere in the zone over and above the glass has many advantages other than the mere reduction in the costs of maintaining protective atmospheres.

For example, the use of the different atmospheres permits the atmosphere over and in contact with the glass to be kept free of those contaminants from the tin-glass refractories interaction, which condense on the roof of the tank and fall onto the surface of the glass, impairing the optical quality thereof.

Generally, the temperature of the glass is maintained by silicon carbide heating elements in the roof of the tank. The performance of such heating elements is improved by being used in an oxidizing atmosphere. Such an atmosphere is most undesirable over the metal of the bath. Other heating elements may require special atmospheres for optimum performance, which is possible using this invention.

Special treatment of the glass may be accomplished, as by applying coatings to the glass, etc., without contaminating the metal of the bath when using this invention.

To further describe the invention, attention is directed to the accompanying drawings, in which:

FIG. 3 is a partial, enlarged sectional view taken on line 3—3 of FIG. 1;

FIG. 4 is a sectional view, similar to FIG. 3, illustrating another embodiment of the invention; and FIG. 5 is a partial sectional view, similar to FIGS. 3 and 4, illustrating still another embodiment of the invention.

Figure 1:
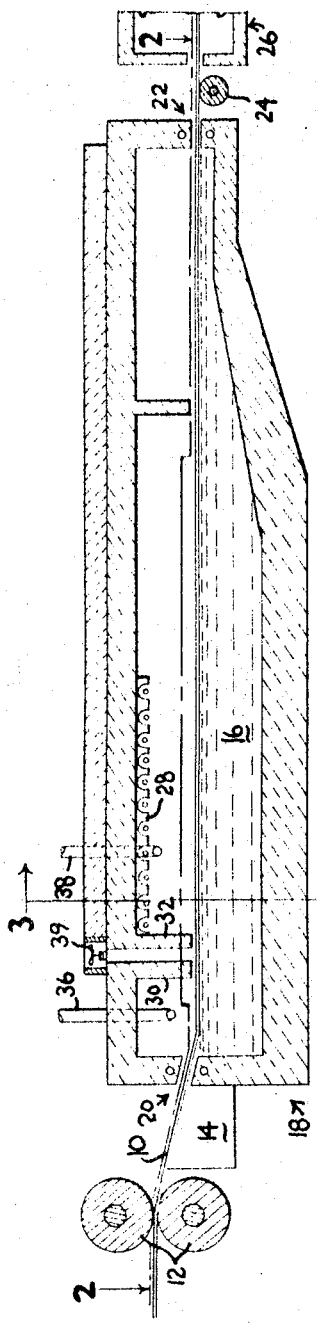
FIG. 1 is a longitudinal section through an apparatus for producing float glass and which illustrates one embodiment of the present invention.
Figure 2:
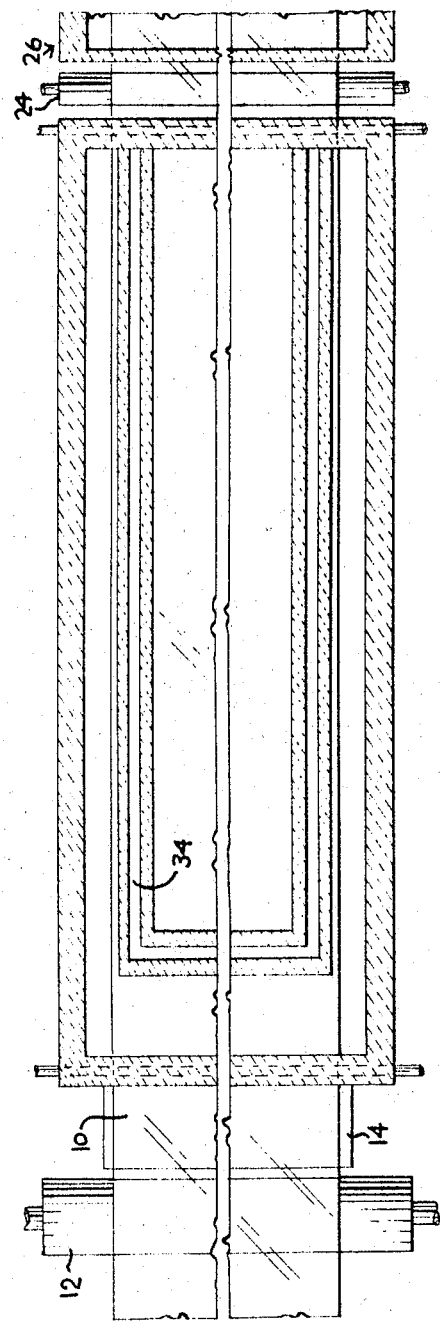
FIG. 2 is a sectional view taken on line 2—2 of FIG. 1.

Reference is made to FIGS. 1 to 3 in which there is illustrated a ribbon of glass 10 being formed by a pair of forming rolls 12 at the exit end of a glass melting tank (not illustrated but of well-known construction) and delivered over an apron, generally identified as 14 but not shown in detail because it forms no part of the present invention, onto a bath of liquid 16 contained within a tank 18. The liquid may be molten tin or an alloy of tin, or other material non-reactive with the glass and having the proper density relationship to support the glass. The glass ribbon enters the tank 18 through an entrance 20 and exits therefrom through an exit 22 to be conveyed on rolls 24 into an annealing lehr, generally identified as 26. The glass may be deposited directly on the liquid bath and thereafter attain its thickness without the use of forming rolls.

The entrance 20 and exit 22 of the tank 18 may be provided with gas curtain seals to prevent the entrance of the ambient atmosphere.

Suitable means, such as heaters 28, are provided to supply heat to the glass to surface or size and surface the glass, depending upon the desired product, or if desired, the center section could be heated by using products of combustion from the glass melting tank which normally are exhausted to the atmosphere.

The apparatus illustrated in FIGS. 1 to 3 is suitable for sizing and surfacing the glass as, for example, in the manner disclosed in the aforesaid copending application, Ser. No. 188,664, wherein a pressure is applied to a central area of the glass which is different from that on the liquid of the bath outside of but in contact with the glass. Preferably, the exposed liquid of the bath and the margins of the glass are subject to one pressure, while the remainder of the glass, especially that lateral or transverse portion of which is at a softening temperature at which it will flow, is subjected to a different pressure. If the pressure on the glass inwardly of its margins is greater than that on the liquid bath outside the glass and in contact with the glass, then the resulting glass will be of a thickness less than equilibrium thickness. Equilibrium thickness is that thickness of glass obtainable when a mass of molten glass is supported on a liquid bath (of greater density than the glass) and permitted to spread freely without external influence.

To accomplish the modification of equilibrium thickness, there is provided a depending wall structure which includes an outer wall 30 and a spaced inner wall 32 forming therebetween a passage 34 which functions as an exhaust passage, as will be described.

The spaced walls 30 and 32 are shown as being U-shaped in FIG. 2; however, they could be extended from entrance end of the tank to exit end of the tank spaced inwardly of the side walls therefrom without departing from the spirit of the invention.

The spaced walls 30 and 32 separate the interior of the tank 18 into zones 30a and 32a, the zone 30a being bounded partially by the free surface of the supporting liquid 16. Pipes 36 and 38 open into the zones 30a and 32a, respectively, for the introduction of atmosphere at suitable pressures thereinto. Because the zone 30a is partially bounded by the free surface of the supporting liquid, the pipe 36 is connected to a source (not shown) of a protective gas, i.e., one which protects the supporting liquid from oxidization. The pipe 38 can be connected to the atmosphere or to a source of pressurized air for sizing the glass to a thickness less than the normal equilibrium thickness.

In order to prevent the entry of air into the zone 30a, especially when the pressure of the air introduced into the zone 32a is greater than the pressure of the gas introduced into the zone 30a, means are provided for maintaining in 34 a pressure lower than either 30a or 32a, forcibly evacuating a mixture of air and gas through the passage 34 separating the walls 30 and 32. Such means may take the form of a series of fans or blowers 39, suitably positioned at the open top of the passage 34, so as to discharge the gaseous mixture to the atmosphere or into a recovery system (not shown) for recovering the protective gas. The same result may be accomplished because of design of the passage 34, i.e., by using the geometry of the passage. By using the described arrangement, it is possible to materially reduce the quantity of the relatively expensive protective gas used while still performing the necessary protection of the liquid of the bath 16. Also, while using this arrangement, modification of the usual equilibrium thickness can be achieved.

Attention is now directed to FIG. 4 of the drawings illustrating another embodiment of the invention in which there is a single depending wall 40 dividing the tank 18 into zones 40a and 40b, the zone 40a being substantially enclosed and partially defined by the free surface of the bath 16 while the zone 40b is open to the ambient.

In order to protect the bath 16 from oxidization, a gas is introduced from a suitable source (not shown) into the zone 40a through pipe 42. By introducing the gas into the zone 40a at a pressure slightly in excess of atmospheric pressure, air from zone 40b is prevented from entering the zone 40a. This arrangement is especially suitable for manufacturing normal equilibrium thickness glass, when the gas pressure is just sufficient to prevent flow of air into the zone 40a or thicker than normal equilibrium glass, when the gas pressure introduced over the bath and edges of the glass is much above the ambient air pressure.

FIG. 5 illustrates still another modification of the invention. The arrangement shown is similar to that shown in FIG. 4 but includes a roof over the main body of glass.

In the embodiment of FIG. 5, the tank 18 is divided at its top into compartments by means of depending walls 50 (only one of which is shown) and which are located to overlie the ribbon of glass being produced. Thus, there are provided edge compartments 50a and a central compartment 50b, the molten bath being exposed to the atmosphere in the compartment 50a.

A suitable protective atmosphere is introduced into the compartment 50a through pipe 52 and flows scross the glass at the bottom of the depending wall 50b through pipe 54. This arrangement, like that of FIG. 4, is especially suitable for the production of greater than equilibrium thickness glass or equilibrium thickness glass and offers protection of the main surface of the glass from dirt, etc., which could fall onto the glass in the FIG. 4 embodiment. Also, with the embodiment of FIG. 5, it is possible to utilize products of combustion from the melting tank to maintain the ribbon at its melting point when undergoing dimensional change.

I claim:

1. In the process of producing glass by floating a ribbon of molten glass having opposed side edges on a liquid bath which extends outwardly beyond said side edges of said ribbon and an uppermost surface therebetween, the improvement which comprises, maintaining a first enclosed zone above each portion of said liquid bath extending outwardly beyond a side edge of said ribbon, introducting a protective atmosphere into each of said first enclosed zones for protecting the entire outwardly extending portions of said liquid bath from oxidation, maintaining a second zone between said first enclosed zones above a portion of the uppermost surface of said ribbon between said first enclosed zones, maintaining a different atmosphere in said second zone and upon the exposed surface of said ribbon disposed in said second zone, and maintaining the atmosphere in each of said first enclosed zones substantially isolated from the atmosphere in said second zone.

2. A process as in claim 1 wherein said atmosphere in said second zone is oxidizing.

3. A process as in claim 2 where said oxidizing atmosphere is air.

4. A process as recited in claim 2 wherein said oxidizing atmosphere comprises hot products of combustion.

References Cited

UNITED STATES PATENTS

| | | | |
|---|---|---|---|
| 2,911,759 | 11/1959 | Pilkington | 65—32 |
| 3,266,880 | 8/1966 | Pilkington | 65—32 |
| 3,395,996 | 8/1968 | Loukes | 65—99 X |

S. LEON BASHORE, Primary Examiner

R. V. FISHER, Assistant Examiner

U.S. Cl. X.R.

65—32, 65, 157, 182, 184